G. D. HAWORTH.
Knots for Check-Row Cord.

No. 208,815. Patented Oct. 8, 1878.

Witnesses:
A. B. Smith
John G. Carter

Inventor:
George D. Haworth
by A. M. Smith
Attorney

N. PETERS, PHOTO-LITHOGRAPHER, WASHINGTON, D C.

UNITED STATES PATENT OFFICE.

GEORGE D. HAWORTH, OF DECATUR, ILLINOIS.

IMPROVEMENT IN KNOTS FOR CHECK-ROW CORDS.

Specification forming part of Letters Patent No. 208,815, dated October 8, 1878; application filed August 28, 1878.

*To all whom it may concern:*

Be it known that I, GEORGE D. HAWORTH, of Decatur, county of Macon, State of Illinois, have invented certain new and useful Improvements in Adjustable and Flexible Knots or Stops for Check-Row Cords, of which the following is a full, clear, and exact description, reference being had to the accompanying drawings, making part of this specification, in which—

Figure 1:
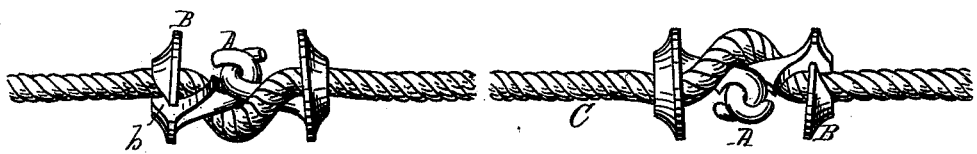
Figure 2:

Figure 1 is a plan or side view of a short section of cord, showing two of the knots or stops applied, and Fig. 2 is a perspective view of one part of the knot.

Similar letters of reference denote corresponding parts in both figures.

My invention relates to that class of check-row cords in which a continuous cord or rope is used, the metallic knots or stops for actuating the seeding devices being placed upon the rope at different points, conforming to the distance at which it is desired to plant the corn; and my invention consists, first, in making the knots or stops in two parts, and connecting them together by means of a flexible or universal joint, for adapting the knots or stops, in the passage of the cord over the machine, to conform readily to the pulley on the check-rowing devices; and, second, to a novel construction of the knot or stop, whereby it is adapted to be readily adjusted for changing the relation of said knots upon the cord as occasion shall require, all as hereinafter explained.

In the accompanying drawings, A A are hooks, which are provided with the button-shaped shanks or heads B B. These hooks are made in the form substantially as shown in Fig. 2, and, when connected together, forming a flexible or universal joint between the heads or shanks B B. The heads B B are provided with U-shaped slots *b b*, for the reception of the cord C, the form of hook being such as that when the parts are in position the slots shall be at right angles to each other.

The manner of connecting the knot to the cord is as follows: The two hooks A A being connected together, the cord is placed in one of the slots *b*, formed in the shanks, thence around the hooks and into the other slot on the opposite shank.

It will be seen that by making the knots or stops in two parts, and connecting them together by means of the flexible or hinged joint, the cord is adapted to conform readily to the pulleys on the check-rowing devices, which prevents, in a great measure, the wear of the cord at the point at which the knot is placed, such wear being usually caused by the cord making such short bends (where the knots are made in one piece) in passing around the pulleys.

Having now described my invention, what I claim as new, and desire to secure by Letters Patent, is—

1. The jointed or flexible knot, stop, or button, adapted to be applied to and to operate in combination with a continuous check-row cord, substantially as described.

2. The jointed or flexible knot or stop for continuous check-row cords, applied to and adapted to be adjusted upon the cord, substantially as described.

GEORGE D. HAWORTH.

Witnesses:
F. P. LEWIS,
J. W. PHILLIPS.